United States Patent
Raghavan et al.

(10) Patent No.: US 10,834,134 B2
(45) Date of Patent: Nov. 10, 2020

(54) SYSTEM, METHOD, AND RECORDING MEDIUM FOR MOVING TARGET DEFENSE

(71) Applicant: International Business Machines Corporation, Armonk, NY (US)

(72) Inventors: Venkat Raghavan, Austin, TX (US); Mudhakar Srivatsa, White Plains, NY (US); Dinesh C. Verma, New Castle, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 439 days.

(21) Appl. No.: 15/171,099

(22) Filed: Jun. 2, 2016

(65) Prior Publication Data
US 2017/0353495 A1    Dec. 7, 2017

(51) Int. Cl.
*H04L 29/06*    (2006.01)
*H04L 12/66*    (2006.01)
*H04L 29/08*    (2006.01)

(52) U.S. Cl.
CPC ........... *H04L 63/20* (2013.01); *H04L 12/66* (2013.01); *H04L 63/0281* (2013.01); *H04L 63/06* (2013.01); *H04L 63/1458* (2013.01); *H04L 67/28* (2013.01)

(58) Field of Classification Search
CPC ..... H04L 63/20; H04L 12/66; H04L 63/0281; H04L 63/06; H04L 63/1416; H04L 63/1458; H04L 67/10; H04L 67/2819; H04L 67/42; H04L 63/068; H04L 67/28
See application file for complete search history.

(56) References Cited

U.S. PATENT DOCUMENTS

| | | | | |
|---|---|---|---|---|
| 10,447,710 | B1* | 10/2019 | Li | H04L 61/6004 |
| 2012/0026870 | A1* | 2/2012 | Challa | H04L 41/046 |
| | | | | 370/230 |
| 2012/0215936 | A1* | 8/2012 | Yang | H04L 47/22 |
| | | | | 709/235 |
| 2013/0254328 | A1* | 9/2013 | Inoue | H04L 29/08 |
| | | | | 709/217 |
| 2014/0283068 | A1* | 9/2014 | Call | H04L 63/1425 |
| | | | | 726/23 |
| 2016/0065612 | A1* | 3/2016 | Evans | G06F 21/53 |
| | | | | 726/22 |

(Continued)

OTHER PUBLICATIONS

Anonymously; "Integrating Secure Connectivity for Third Party Mobile Cloud Services Providers"; http://ip.com/IPCOM/000241712; May 26, 2015.

(Continued)

*Primary Examiner* — Linglan E Edwards
*Assistant Examiner* — Forrest L Carey
(74) *Attorney, Agent, or Firm* — Kevin M. Jordan, Esq.; McGinn IP Law Group, PLLC (57) ABSTRACT

A network management method, system, and non-transitory computer readable medium, include a data center gateway including a set of rules for moving target defense and communicates with a service provider and a cloud gateway including the set of rules to communicate with the data center gateway by satisfying the moving target defense such that a client receives a service from the service provider when the cloud gateway requests the service from the data center gateway.

11 Claims, 5 Drawing Sheets

(56) References Cited

U.S. PATENT DOCUMENTS

2016/0301695 A1* 10/2016 Trivelpiece ............. H04W 4/70
2016/0337484 A1* 11/2016 Tola .................... H04L 12/6418
2017/0195295 A1* 7/2017 Tatlicioglu .......... H04L 63/0414

OTHER PUBLICATIONS

Microsoft; "Security Virtual Appliances"; http://ip.com/IPCOM/000177032; Dec. 3, 2008.
Chun-Jen Chung; "SeReNe: On Establishing Secure and Resilient Networking Services for an SDN-based Multi-Tenant Datacenter Environment"; 2015 IEEE International Conference on Dependable Systems and Networks Workshops. Jun. 22, 2015.
Boukhriss, Hicham; "New Technique of Localization a Targeted Virtual Machine in a Cloud Platform"; Nov. 27, 2014.

* cited by examiner

FIG. 1

NETWORK MANAGEMENT SYSTEM 100

NETWORK MANAGEMENT METHOD 300

SYSTEM, METHOD, AND RECORDING MEDIUM FOR MOVING TARGET DEFENSE

BACKGROUND

The present invention relates generally to a network management system, and more particularly, but not by way of limitation, to a network management system for implanting a moving target defense in existing systems by including a cloud gateway and a data center gateway having a set of rules for the moving target defense to facilitate a data exchange between a client and a service provider, such that the moving target defense is only between (e.g., impacts) the cloud gateway and the data center gateway.

Public services offered on the Internet (e.g., a web based service or email service) are subject to a variety of attacks from malicious elements in the Internet. The services are protected by various security appliances such as firewalls, security appliances, and other mechanisms. However, the conventional security appliances have been unable to adequately leverage new emerging mechanisms such as moving target defense or detect distributed denial of service (DDoS) attack in an adequate amount of time. Moving Target Defense (MTD) aims at creating asymmetric uncertainty at the attackers die, by changing the attack surface. MTD is the concept of controlling change across multiple system dimensions to increase uncertainty and apparent complexity for attackers, reduce their window of opportunity, and increase their costs of their probing and attack efforts.

That is, moving target defense has conventionally been an academic concept because making a service application (e.g., a website) use moving target defense increases cost of development, makes it difficult to test and debug applications, and makes it difficult to manage and maintain an application. Also, the schedule of changes in the moving target defense needs to be known to the clients such that the moving target defense only works if a set of clients is finite and limited. That is, for services open publicly, schedule changes would be publicly known to the attacker, so approach is added complexity for little additional security.

Thus, there is a technical problem in the conventional techniques in that the conventional techniques are not capable of supporting a moving target defense approach.

SUMMARY

In view of the technical problem, the inventors have considered a non-abstract improvement to a computer technology via a technical solution to the technical problem in which the original service remains unchanged at a default configuration and implementing security services (e.g., a data center gateway) in front of the original service that implements mechanisms to have a moving target defense which continuously change in their characteristics. Access to public service is provided by a large geographically distributed set of reverse proxies (e.g., via a cloud gateway) of the original service which present a common view to the public, while using dynamically changing configurations to manage their connectivity and access to the security proxies. Thus, the new configuration allows the original service to be tested and operated at current level of complexity and costs because moving target defense aspects are restricted to the security services such that they can use a variety of techniques to protect and vary their configurations. Also, the attempts of an attacker in a distributed denial of service attack attempts can be thwarted by the large number of reverse proxies dynamically being generated as the cloud gateway.

In an exemplary embodiment, the present invention can provide a network management system, including a data center gateway including a set of rules for moving target defense and communicating with a service provider, and a cloud gateway including the set of rules to communicate with the data center gateway by satisfying the moving target defense such that a client receives a service from the service provider when the cloud gateway requests the service from the data center gateway.

Further, in another exemplary embodiment, the present invention can provide a network management method, including creating a set of rules for moving target defense for a data center gateway, distributing the set of rules to a cloud gateway, receiving, via the cloud gateway, a request from a client to access a service provided by a service provider, and accessing the service to give to the client by having the cloud gateway use the set of rules to communicate with the data center gateway to satisfy a moving target defense.

Even further, in another exemplary embodiment, the present invention can provide a non-transitory computer-readable recording medium recording a network management program, the program causing a computer to perform: creating a set of rules for moving target defense for a data center gateway, distributing the set of rules to a cloud gateway, receiving, via the cloud gateway, a request from a client to access a service provided by a service provider, and accessing the service to give to the client by having the cloud gateway use the set of rules to communicate with the data center gateway to satisfy a moving target defense.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
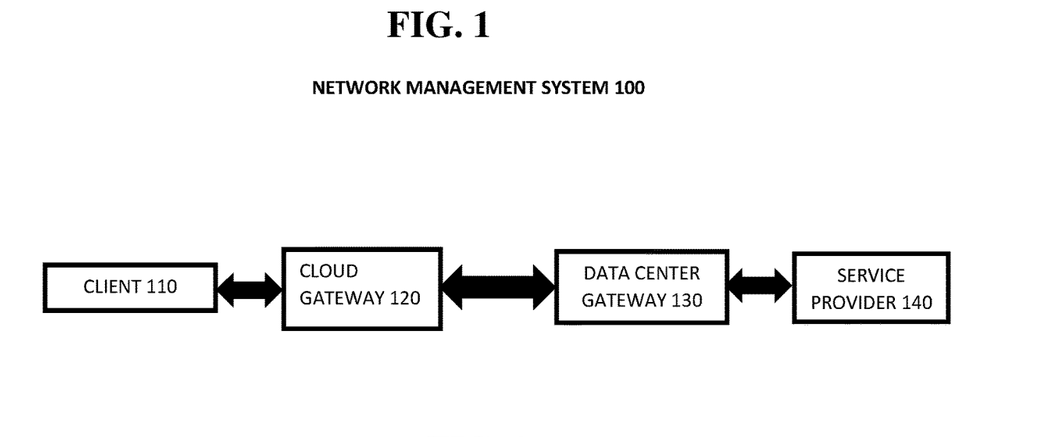
FIG. 1 exemplarily shows a block diagram illustrating a configuration of a network management system 100.

With reference now to FIG. 1, the network management system 100 includes a client 110, a cloud gateway 120, a data center gateway 130, and a service provider 140. The client 110, the cloud gateway 120, the data center gateway 130, and the service provider 140 of the network management system 100 each can include a processor and a memory, with the memory storing instructions to cause the processor to execute each circuit of network management system 100. The processor and memory may be physical hardware components, or a combination of hardware and software components. In the preferred embodiment, the cloud gateway 120 is implemented as a service running in a cloud computing node.

Figure 4:
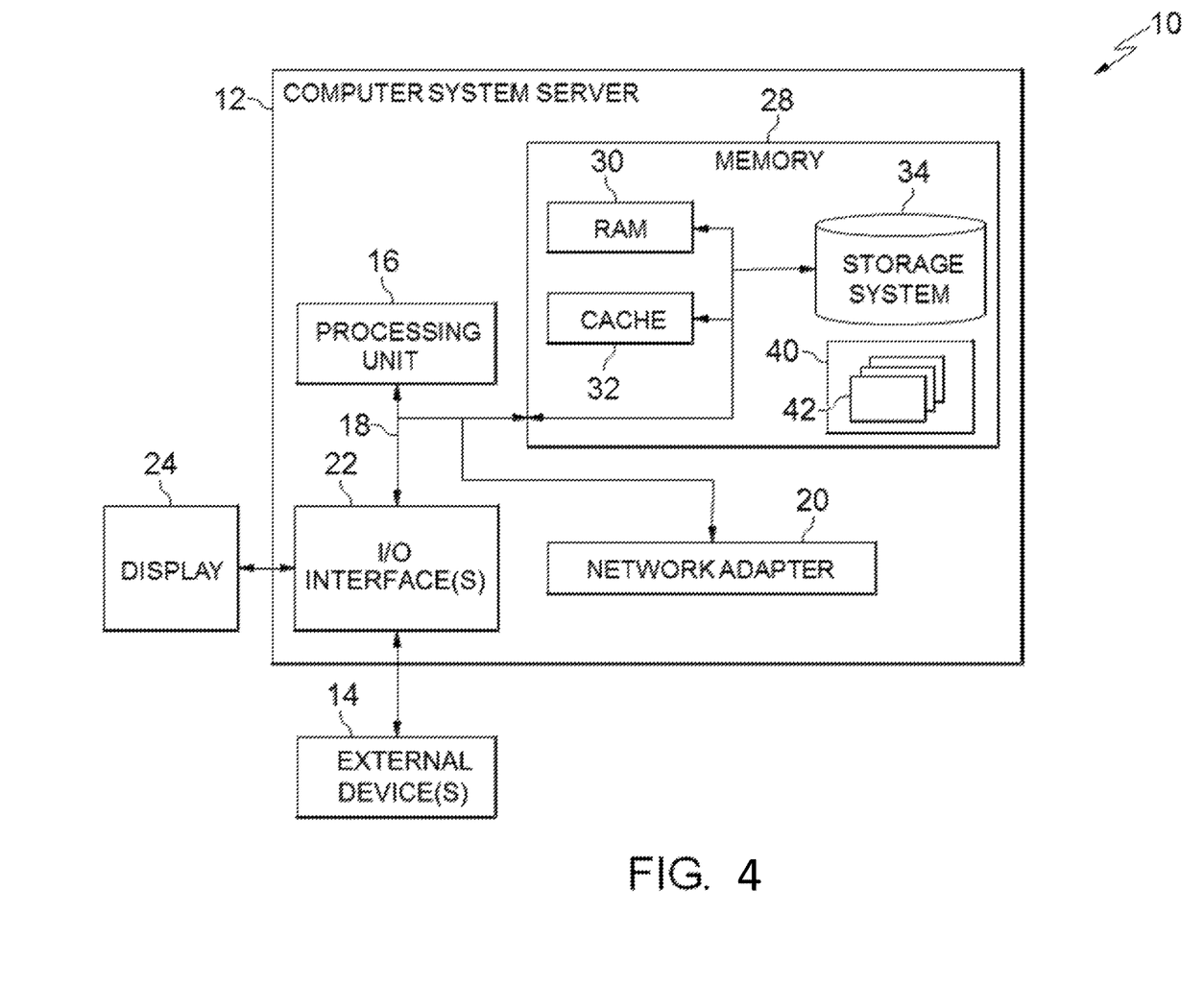
FIG. 4 depicts a cloud computing node 10 according to an exemplary embodiment of the present invention.
Figure 5:
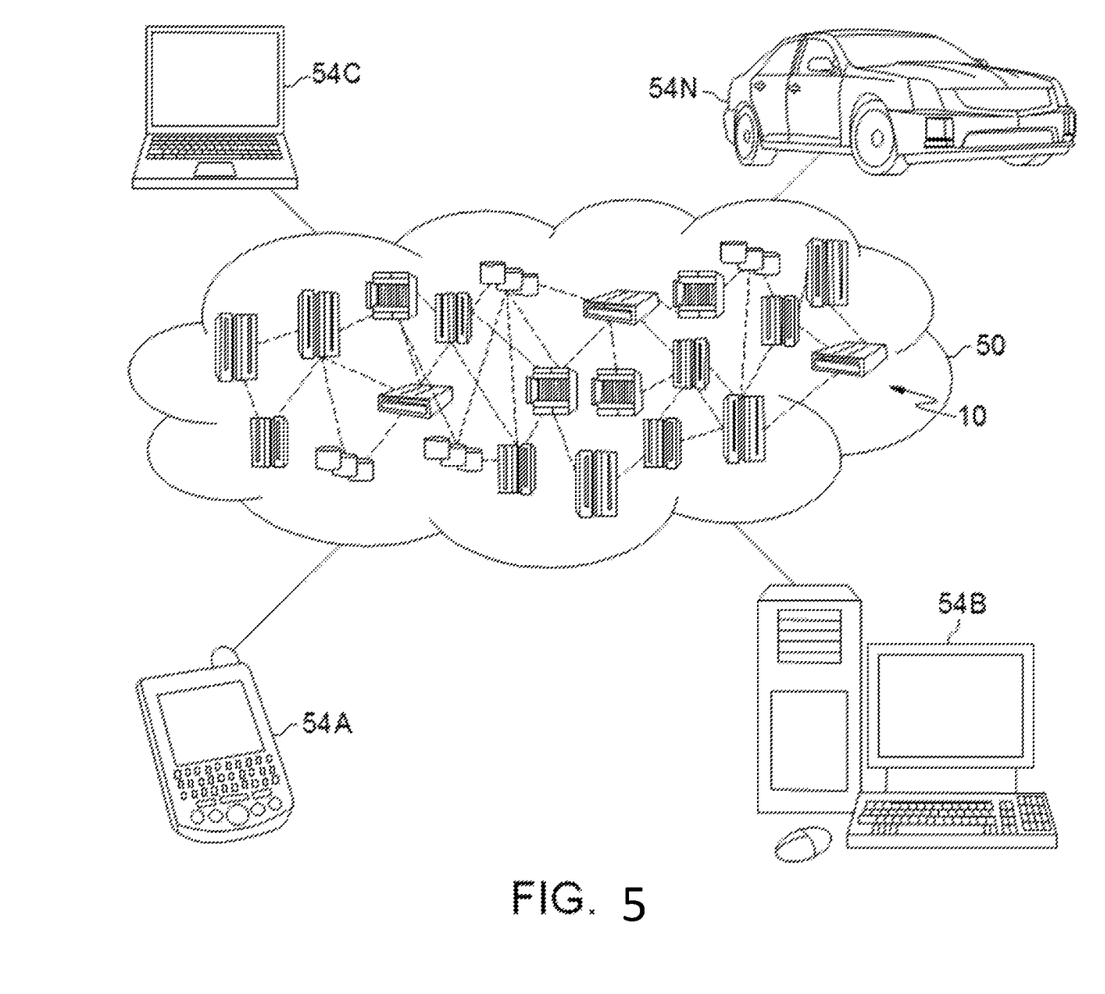
FIG. 5 depicts a cloud computing environment 50 according to another exemplary embodiment of the present invention.
Figure 6:
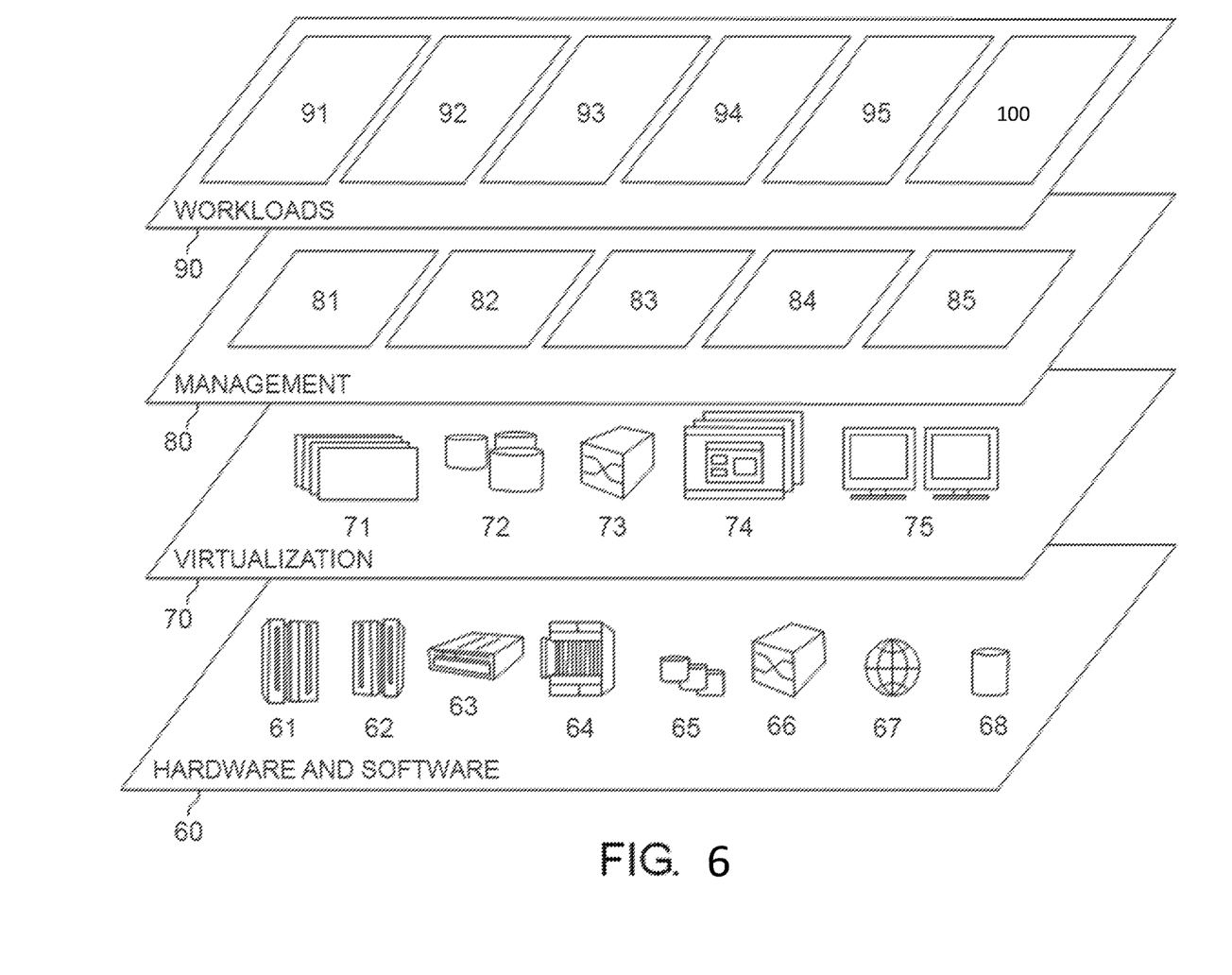
FIG. 6 depicts abstraction model layers according to an exemplary embodiment of the present invention.

Although as shown in FIGS. 4-6 and as described later, the computer system/server 12 is exemplarily shown in cloud computing node 10 as a general-purpose computing circuit which may execute in a layer the network management system 100 (FIG. 6), it is noted that the present invention can be implemented outside of the cloud environment.

Figure 2:
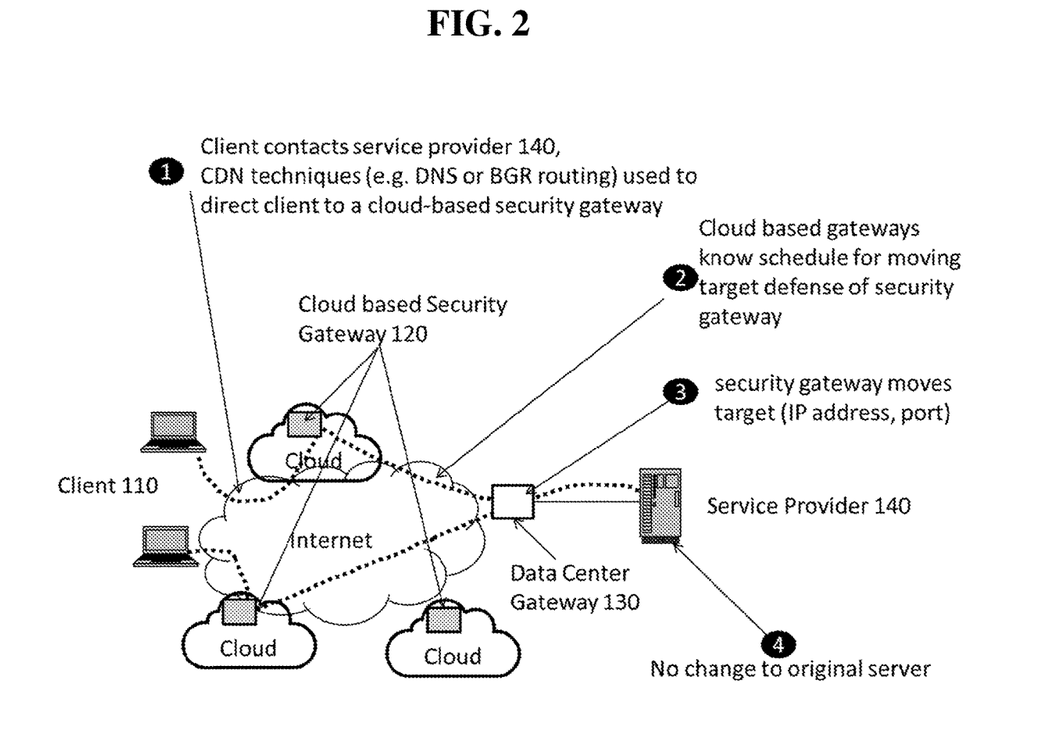
FIG. 2 exemplarily shows an exemplary operation of the network management system 100.

Referring to FIG. 1 and FIG. 2, a service can be hosted by a service provider 140 in a data center connected to the Internet.

Two intermediaries are located in between the client 110 and the service provider 140. The first intermediary is a cloud gateway 120 which acts as a proxy for the original service 140 to the client 110. The second intermediary is a data center gateway 130 which performs security functions such as checking for well-formed-ness (i.e., syntax, etc.) of input arguments, checking for potential buffer overrun attacks, implementing access control restrictions etc.

A moving target defense is utilized between the data center gateway 130 and the cloud gateway 120.

Thus, the original service of the service provider 140 can be used without modification, thereby adding nothing to the amount of complexity and costs (i.e., processing overhead, additional testing and validation etc.) required to operate the service. No request is allowed to the service provider 140 unless it comes first from the cloud gateway 120 which has the rules of the moving target defense such that the cloud gateway 120 can communicate with the data center gateway 130 initiating the moving target defense based on the rules to issue the service from the service provider 140 to the client 110. The cloud gateway 120 further implements access control rules so that it will only accept requests from an instance of the data center gateway 130.

The moving target defense utilized between the cloud gateway 120 and the data center gateway 130 can be utilized by using any of a predetermined set of rules that the cloud gateway 120 and the data center gateway 130 create. For example, the set of rules implementing the moving target defense can include changing a port number at which the data center gateway 130 operates at pre-determined intervals, such intervals being communicated to the set of active cloud gateways (e.g., the cloud gateway 120); changing security keys and/or certificates used for communication between the cloud gateway 120 and data center gateway 130 at periodic intervals; switching an operating system on which the data center gateway 130 and/or the cloud gateway 120 run(s) at random intervals; having multiple implementations of a same argument checking code at the date center gateway 130, and changing the preferred implementation at random intervals; and/or having the underlying implementation of the cloud gateway and data center gateway change at random intervals (e.g. if a web based service is used, switching the cloud gateways and data center gateway implementation from an Apache-based service to a first type based service to a second type-based service to a third type-based service at random intervals (i.e., an nginx®, lighttpd®, Jigsaw® based service). In an illustrative embodiment, a rule may state that the port used by the data center gateway 130 will follow the following sequence with the port number changing every 10 minutes—port 80, port 90, port 100, port 120. The cloud data gateway connects to the data center gateway on the specified port during the interval that it is valid. In some embodiments, the data center gateway 130 may provide a special service call that can inform the cloud gateway 120 if it needs to access it on a different port number. As an example, if an authorized cloud gateway calls the data center gateway on port 80 within 30 seconds of the interval when the data center gateway has switched over to port 90, the data center gateway can send a redirect request in the response to inform the cloud gateway that it needs to contact it on the new port number of 90.

Therefore, because the set of rules are only known to the cloud gateway 120 and the data center gateway 130 for the moving target defense, and the data center gateway 130 can only be accessed via cloud gateway 120, a cloud-based reverse proxy implementation of security services can enable new models for handling security for Internet-based services, and enable virtual moving target defense. That is, since the changes of the moving target defense are always being done at cloud gateway 120 and data center gateway 130 which have a fixed preset functionality, these changes can be done without impact the cost and operation of the background service.

Further, the cloud gateway 120 can include "n" number of proxy servers, where "n" is an integer greater than 0. The number of proxy servers that the client 110 can communicate with can dynamically change based on the load requested from the proxies. The proxy servers are distributed in a cloud based setting. The different proxy servers can be located at many different geographic locations, e.g. one proxy may be located at a cloud site in New York, another proxy may be located at a cloud site in Washington, D.C., another one in Amsterdam, Netherlands, while yet another one can be located in Sydney, Australia. The number and locations of the proxy servers can change over time.

For example, if the cloud gateway 120 has thirty proxy servers and the load increases, the cloud gateway 120 can increase to forty proxies such that the system is not overloaded. These forty proxies can be located at many different geographic locations. Thus, if the cloud gateway 120 is under a distributed denial of service (DDoS) attack, the cloud gateway 120 can scale the number of proxies up such that the cloud gateway 120 is not impacted. In other words, the DDoS attacker will be incapable of knowing how many requests to send to the cloud gateway 120 to overload the cloud gateway 120 because the number of proxy servers making up the cloud gateway 120 can scale up accordingly.

Also, each of the proxies of the cloud gateway 120 can include rate control mechanisms such as token buckets to deal with DDoS attacks. Rate control mechanisms restrict the total rate of requests that can be made to the service provider 140. In an exemplar embodiment using token bucket as the rate control mechanism, if there is a known number of requests per second that the data center gateway 130 can handle, the total number of known requests per second can be divided into each of the proxies such that each proxy is only able to transmit a predetermined number of requests per second. Therefore, if the proxies receive more requests than the data center gateway 130 can handle, the proxies are limited to sending only the predetermined number of requests per second (i.e., the amount of "token buckets" of the proxy). That is, the proxies are better able to deal with DDoS attacks since each of the proxies can enforce a specific rate control approach to limit the total number of requests that reach to the data center gateway 130. The proxies can coordinate the rate control by using a mechanism such as the token bucket maintained at the common security gateway which assigns tokens to each of the cloud based security gateways, or alternatively by allocating a fixed rate at which requests can be send to the data center gateway 130 by each of the different proxies. As such, the cloud gateway 120 can reliably and securely control the flow of request processing. In other embodiments, other rate control mechanisms including but not limited to leaky bucket, fair queuing, weighted round robin queueing, virtual clock mechanisms etc. may be used.

Referring to FIG. 2, the network management system 100 can be operated by a client 110 contacting a web-server and the cloud gateway 120 (e.g., "n" number of proxies) receiving the request to access a service provided by the service provider 140. The cloud gateway 120 includes a set of rules for moving target defense that are preconfigured on the cloud gateway 120. Based on the set of rules, the cloud gateway 120 contacts the data center 130 by utilizing the set of rules to access the data center gateway 130 such that service is provided from the service provider 140 to the data center gateway 130 and ultimately to the client 110. The data center gateway 130 continuously operates according to the set of rules and there is no change in the service provider 140 operation.

Figure 3:
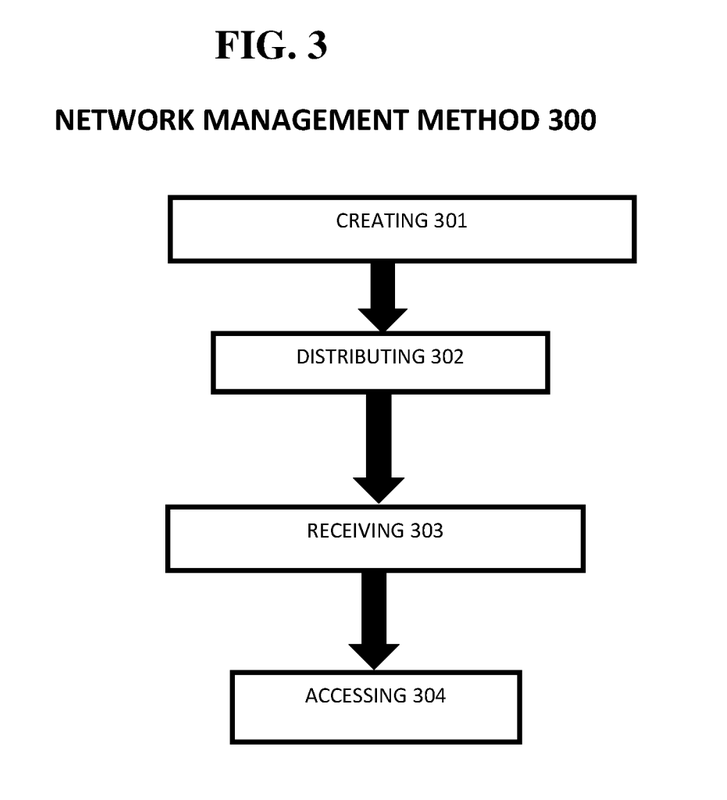
FIG. 3 exemplarily shows a high level flow chart for a network management method 300.

FIG. 3 shows a high level flow chart for a method 300 of network management.

Step 301 creates a set of rules for a moving target defense for a data center gateway 130 that communicates with a service provider 140.

Step 302 distributes the set of rules to a cloud gateway 120 that communicates with a client 110.

Step 303 receives a request from the client 110 via the cloud gateway 120 indicating that the client 110 is requesting data from the service provider 140.

Step 304 uses the set of rules stored on the cloud gateway 120 to access the data center gateway 130 such that the service is provided from the service provider to the client 110 (i.e., by using the moving target defense).

It is noted that the set of rules is inaccessible by client 110 and the service provider 140 such that the cloud gateway 120 and the data center gateway 130 use the moving target defense based on the set of rules to deliver the service from the service provider 140 to the client 110.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 4, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the network management system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A network management system, comprising:
   a processor; and
   a memory, the memory storing instructions to cause the processor to execute:
      a data center gateway acting as a front-end to an original device including a set of rules for a moving target defense and which communicates with a service provider; and
      a cloud gateway including the set of rules to communicate with the data center gateway by satisfying the moving target defense such that a client receives a service from the service provider when the cloud gateway requests the service from the data center gateway, the cloud gateway being implemented as a service running in a cloud computing node,
   wherein the data center gateway is implemented in front of an original service on the original device such that the original service remains unchanged at a default configuration,
   wherein the moving target defense is restricted to a security service separate from the original service,
   wherein the set of rules includes, at predetermined intervals, changing a port number at which the data center gateway operates,
   providing multiple implementations of a same argument checking code at the data center gateway, and changing a preferred implementation at a random interval,
   wherein the cloud gateway includes a dynamically changing number of proxy servers,
   wherein the cloud gateway includes a plurality of proxy servers, a number of the plurality of proxy servers dynamically changing based on a load on the cloud gateway from the client, wherein the cloud gateway includes a rate control scheme limiting a total rate of requests to the data center gateway;

wherein the cloud gateway includes a predetermined number of token buckets limiting a total number of requests to the data center gateway, and wherein the set of rules further includes, at a random interval, switching an operating system on which the data center gateway and/or the cloud gateway runs.

2. The system of claim 1, wherein the data center gateway communicates only with the service provider and the cloud gateway, and wherein the cloud gateway communicates only with the client and the data center gateway.

3. The system of claim 1, wherein the set of rules is inaccessible by the client.

4. The system of claim 1, wherein the plurality of proxy servers with which the client can communicate.

5. The system of claim 1, wherein the set of rules further includes:

at periodic intervals, changing at least one of a security key and a certificate used for communication between the cloud gateway and the data center gateway; and at random intervals, changing an underlying implementation of the cloud gateway and the data center gateway.

6. A network management method, comprising:

creating a set of rules for moving target defense for a data center gateway acting as a front-end to an original device;

distributing the set of rules to a cloud gateway, the cloud gateway being implemented as a service running in a cloud computing node;

receiving, via the cloud gateway, a request from a client to access a service provided by a service provider; and accessing the service requested by the client by having the cloud gateway use the set of rules to communicate with the data center gateway to satisfy the moving target defense, wherein the data center gateway is implemented in front of an original service on the original device such that the original service remains unchanged at a default configuration, wherein the moving target defense is restricted to a security service separate from the original service, wherein the set of rules includes, at predetermined intervals, changing a port number at which the data center gateway operates, providing multiple implementations of a same argument checking code at the data center gateway, and changing a preferred implementation at a random interval, wherein the cloud gateway includes a dynamically changing number of proxy servers, wherein the cloud gateway includes a plurality of proxy servers, a number of the plurality of proxy servers dynamically changing based on a load on the cloud gateway from the client, wherein the cloud gateway includes a rate control scheme limiting a total rate of requests to the data center gateway, wherein the cloud gateway includes a predetermined number of token buckets limiting a total number of requests to the data center gateway, and wherein the set of rules further includes, at a random interval, switching an operating system on which the data center gateway and/or the cloud gateway runs.

7. The method of claim 6, wherein the data center gateway communicates only with the service provider and the cloud gateway, and wherein the cloud gateway communicates only with the client and the data center gateway.

8. The method of claim 6, wherein the set of rules is inaccessible by the client.

9. A non-transitory computer-readable recording medium recording a network management program, the program causing a computer to perform:

creating a set of rules for moving target defense for a data center gateway acting as a front-end to an original device;

distributing the set of rules to a cloud gateway, the cloud gateway being implemented as a service running in a cloud computing node;

receiving, via the cloud gateway, a request from a client to access a service provided by a service provider; and accessing the service requested by the client by having the cloud gateway use the set of rules to communicate with the data center gateway to satisfy the moving target defense, wherein the data center gateway is implemented in front of an original service on the original device such that the original service remains unchanged at a default configuration, wherein the moving target defense is restricted to a security service separate from the original service, wherein the set of rules includes, at predetermined intervals, changing a port number at which the data center gateway operates, providing multiple implementations of a same argument checking code at the data center gateway, and changing a preferred implementation at a random interval, wherein the cloud gateway includes a dynamically changing number of proxy servers, wherein the cloud gateway includes a plurality of proxy servers, a number of the plurality of proxy servers dynamically changing based on a load on the cloud gateway from the client, wherein the cloud includes a rate control scheme limiting a total rate of requests to the data center gateway, wherein the cloud gateway includes a predetermined number of token buckets limiting a total number of requests to the data center gateway, and wherein the set of rules further includes, at a random interval, switching an operating system on which the data center gateway and/or the cloud gateway runs.

10. The non-transitory computer readable medium of claim 9, wherein the data center gateway communicates only with the service provider and the cloud gateway, and wherein the cloud gateway communicates only with the client and the data center gateway.

11. The non-transitory computer readable medium of claim 9, wherein the set of rules is inaccessible by the client.

* * * * *